United States Patent [19]

Gaigé et al.

[11] 3,728,393

[45] Apr. 17, 1973

[54] PROCESS OF SYNTHESIS OF LONG-CHAIN ALIPHATIC AMINES

[75] Inventors: René Gaigé, Pont de Glaix; Gérard Schneider, Caluire, both of France

[73] Assignee: Progil, Paris, France

[22] Filed: Oct. 23, 1969

[21] Appl. No.: 868,825

[30] Foreign Application Priority Data

Oct. 31, 1968  France..................................650571

[52] U.S. Cl...............................................260/585 A
[51] Int. Cl.................................................C07c 85/02
[58] Field of Search..................................260/585 A

[56] References Cited

UNITED STATES PATENTS 2,805,254  9/1957  Nicolaisen........................260/585 A
3,487,111  12/1969  Kurtz et al.........................260/585 A
3,299,142  1/1967  Simpson............................260/585 A
3,389,179  6/1968  James...............................260/585 A

*Primary Examiner*—Lewis Gotts
*Assistant Examiner*—C. F. Warren
*Attorney*—Browdy & Neimark

[57]     ABSTRACT

Process of synthesizing long-chain aliphatic primary amines by reacting 1-bromo-alkanes with an excess of ammonia at a temperature not exceeding the critical temperature of ammonia, for example at 60°–130°C, under a pressure of 5 to 40 atmospheres in the presence of a solvent which is a mixture of an organic compound and water which forms an homogeneous minimum boiling point azeotrope.

7 Claims, 1 Drawing Figure

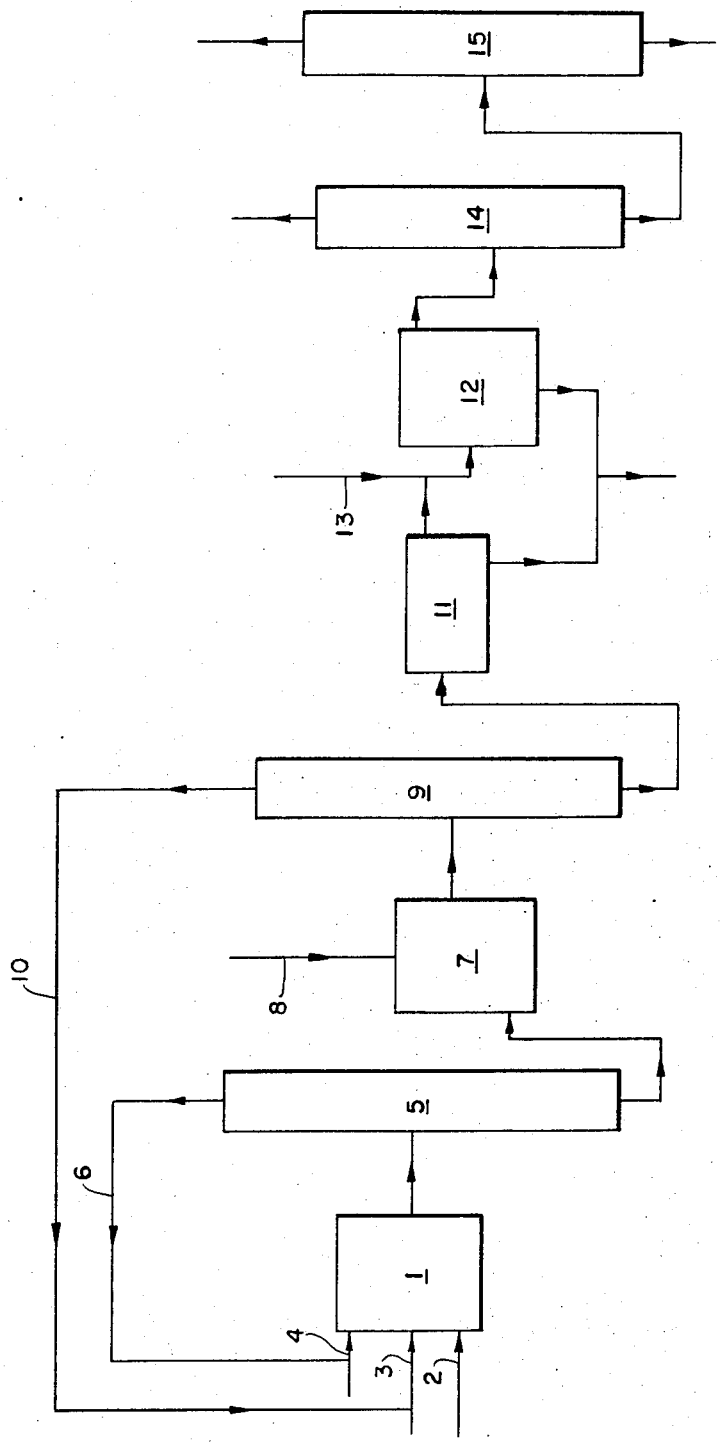

PROCESS OF SYNTHESIS OF LONG-CHAIN ALIPHATIC AMINES

The present invention relates to a process of synthesis of long-chain aliphatic primary amines, by reaction of bromo-alkanes with ammonia.

Processes of manufacturing aliphatic amines have been described consisting of reacting gaseous or liquid ammonia with halogeno-alkanes, in the presence or in the absence of solvents or catalysts. This type of synthesis, however, has several difficulties. It leads generally to the obtaining of a mixture of primary, secondary, tertiary amines and of quaternary ammonium salts, and the orientation of the reaction towards a high selectivity in a determined amine is laborious and hazardous; moreover, the total conversion rate of halogeno-alkanes into amines is often insufficient.

A mode of reaction of the 1-bromo-alkanes with ammonia has now been found which permits, due to a combination of optimal operative conditions and to the use of a new type of solvent, to reach a high total yield, together with an optimal selectivity in primary amines.

In its most general form, the process according to the present invention consists of reacting 1-bromo-alkanes with ammonia in excess with regard to stoichiometry, at a temperature not exceeding ammonia critical temperature, under a pressure of 5 to 40 atmospheres, in the presence of a solvent consisting of a mixture of an organic compound and of water, giving rise to the formation of an homogeneous minimum boiling point azeotrope.

This process is especially convenient for the preparation of the primary aliphatic amines having a branched or linear chain and containing at least eight carbon atoms in their molecules and especially for the preparation of the so-called "fatty amines." As examples of compounds which may be obtained acccording to this method are n-octylamine, n-nonylamine, n-dodecylamine, n-tridecylamine, n-hexadecylamine, n-octadecylamine, n-eicosylamine, and n-docosylamine.

The 1-bromo-alkanes used as raw materials may be pure products or technical products containing small quantities of 2-bromo-alkanes and aliphatic hydrocarbons. They may be constituted of only a compound or of a mixture of different 1-bromo-alkanes. They are prepared according to known techniques, for example by the reaction of hydrogen bromide on olefins, in the presence of oxygen or of a peroxide, or by the reaction of hydrogen bromide on alcohols in the presence of a strong mineral acid, etc. For example, advantageously the raw reaction product may be used which is obtained by reacting at a low temperature, for example between 0° and 20°C, gaseous hydrogen bromide, with the desired α-olefin (s) in solution in an inert solvent such as pentane, hexane or heptane, in the presence of a catalytic quantity of oxygen, then by removing solvent by means of evaporation, possibly after washing the reaction mass with water.

The respective ratios of the various constituents used in the amination process according to the invention may vary in large limits, but in any case it is proper to operate with a large excess of ammonia with regard to stoichiometry and in a diluted reaction medium in order to favor the conversion rate of bromo-alkanes and the selectivity in primary amines. Thus, the molar ratio of $NH_3$/bromo-alkane is favorably maintained between 10/1 and 40/1, preferably 20 to 30/1 while the molar ratio of solvent mixture/bromo-alkane is at least 15/1; the respective quantities of water and organic compound constituting the solvent are conditioned by the composition of the corresponding azeotrope.

As indicated above, the reaction temperature must not exceed the critical temperature of ammonia, that is about 130°C. It is possible to operate between 60° and 130°C, the most favorable temperature range being between 100° and 120°C. The reaction is conducted under a pressure of between 5 and 40 atmospheres, preferably 15 to 25. Practically, the reaction may be achieved under the autogenous pressure which is brought within the indicated limits by conveniently adjusting the other variables. The organic compound used as a solvent constituent must be a polar compound, miscible with water and inert under the reaction conditions; it must be itself a solvent of the starting bromo-alkanes and, according to one characteristic of the invention, form with water an homogeneous minimum boiling point azeotrope. The compounds answering these requirements may be chosen advantageously from the class of alcohols, nitriles, ether-oxides, etc. Among those compounds especially useful are ethanol, propanol, isopropanol, tert-butyl alcohol, acetonitrile, 1,4-dioxane, etc.

The time necessary for the reaction varies, of course, with regard to the precise conditions chosen within the limits which have been indicated, but it varies, in a general way, between 1 and 3 hours. When operating in the preferred ranges mentioned for the molar ratios of constituents, temperatures and pressures, the residence time necessary to obtain a maximal conversion rate is about 120 to 150 minutes.

The amines are obtained in the form of hydrobromides; they are easily recovered in free state according to known methods, such as treatment by an aqueous solution of a strong base, as sodium or potassium hydroxide. The primary amine may be separated from other formed aminated compounds, for example by distillation under reduced pressure.

The process according to the present invention permits the obtaining of conversion rates of bromo-alkanes into amines which range near theoretical, the selectivity in primary amines being generally about 80 percent of the total weight of the obtained aminated compounds.

This synthesis method may be achieved batch-wise but may also be conducted quite easily continuously.

The following description, related to the schematic drawing illustrates a practical form of achievement of the process according to the invention.

Reactor 1 is fed with bromo-alkane, solvent mixture and ammonia, respectively by the pipes 2, 3 and 4. Then the reaction mass passes into a distillation column 5 operating under pressure, in which un-reacted ammonia goes out at the head and is recycled, by piping 6, to the reactor. The mixture remaining at the bottom of the column, the temperature of which is still about that of the reaction, is treated in the apparatus 7 by an alkaline liquor such as an aqueous solution of sodium or potassium hydroxide, etc., arriving by piping 8. After leaving apparatus 7, the slurry passes into a second distillation column 9 running preferably under atmospheric pressure where the azeotrope constituting the solvent is separated and recycled through pipe 10, after condensation, into the reactor. The liquid product remaining is sent to decanter 11 in which is maintained a temperature higher than the amines melting point, and in which are separated an upper organic phase mainly constituted of amines and a lower aqueous phase containing sodium bromide. Amines are washed in 12 by means of hot water arriving by piping 13 in order to remove traces of sodium bromide. The aqueous phases drawn off at the bottom of apparatus 11 and 12 may be treated to recover bromine, especially for the preparation of hydrogen bromide which is used to make the starting bromo-alkanes.

The amines are advantageously dried in column 14 in which water is removed by azeotropic distillation, for example by means of benzene. At last the primary amine is separated by distillation under reduced pressure in column 15. If the starting bromo-alkanes contain a small quantity of the corresponding alkane, this is removed previously in a supplementary column (not represented on the scheme). The distillation tailings of column 15 contain a mixture of aminated compounds having a major proportion of secondary amines. It may be treated for the recovery of those compounds.

Of course, the hereinabove description is given only in an illustrative way and does not limit the scope of the invention. The process may be also practically achieved by modifications to the proposed application mode or in adopting a different application form feasible by those skilled in the art. It is possible, for example, to achieve amination in several reactors, or to cool the reaction mass below the melting point of the amine hydrobromides, to separate these by filtration and distil the azeotrope from the filtrate.

The examples hereinafter, given in a non-limitative way, emphasize the results obtained according to the invention. Unless indicated to the contrary, parts are parts by weight.

EXAMPLE 1

Series of tests have been made from 1-bromo-decane and from 1-bromo-tetradecane, using several solvents according to the invention.

For this, solvent and bromo-alkane have been introduced into an autoclave, then ammonia has been fed, approximately up to the proximity of the saturating vapor pressure of $NH_3$ at room temperature. Then the mixture has been heated in the autoclave at temperatures of 110°–120°C and heating has been continued for 1 to 3 hours, according to the tests. Then the reaction mass has been drawn off directly, and a 10 percent aqueous solution of sodium hydroxide has been added. Solvent has been recovered by azeotropic distillation. The column tailings comprised an organic phase constituted of amines and an aqueous phase. From the aqueous phase, the conversion rate of bromo-alkanes has been determined by bromine ions determination.

The table hereinafter indicates the reaction conditions applied in each of the tests and the conversion rates obtained.

EXAMPLE 2

This example is described by reference to the drawing. In reactor 1 running at 120°C and under 25 atmospheres, there were introduced, per hour, 155 parts of technical 1-bromo-octadecane containing 2.5 percent of 2-bromo-octadecane and 1.6 percent of the corresponding saturated hydrocarbon, 840 parts of ethanol, 38 parts of water and 195 parts of ammonia. The contact time of reagents was 150 minutes.

From column 5, operating under 4 absolute atmospheres, with a temperature of 120°C at the bottom and of −10°C at the head, there was distilled 182 parts/hour of ammonia which was recycled into reactor 1. The apparatus 7 being under a pressure of 4 atmospheres was fed with 205 parts/hour of a 10 percent aqueous solution of sodium hydroxide. In column 9, under atmospheric pressure, at 100°C at the bottom and 78°C at the head, 880 parts/hour were distilled constituted with the azeotrope which carried away the remaining ammonia. In decanter 11 and washing apparatus 12 the reaction mass was at 80°C and under normal pressure. Through pipe 13, there were introduced 90 parts/hour of water at 80°C. There was drawn off at the foot of apparatus 11 and 12, on the whole, per

| bromo-alkane | Solvent | | Reaction temperature (°C.) | Pressure (atmospheres) | Reaction time (hrs.) | Conversion rate (percent) |
|---|---|---|---|---|---|---|
| | Organic compound (moles) | Water (moles) | | | | |
| 1-bromodecane 1 mole | ethanol 29.1 | 3.33 | 110 | 25 | 2 | 99.1 |
| 1-bromo tetradecane 1 mole | ethanol 25 | 3 | 120 | 22 | 2 | 99.4 |
| 1-bromo tetradecane 0.7 mole | isopropanol 17.5 | 8 | 120 | 22 | 2 | 98.3 |
| 1-bromo tetradecane 0.74 mole | acetonitrile 25 | 11 | 120 | 23 | 3 | 99.2 |
| 1-bromo tetradecane 1 mole | 1,4 dioxane 15 | 16 | 120 | 22.5 | 1 | 99.3 | hour, 330 parts of sodium bromide aqueous solution. The organic phase was dried in column 14 fed in benzene, where temperature was 150°C at the bottom and 80°C at the head. After octadecane separation, this phase passed at last into column 15 running under a pressure of 100 mm.Hg in which the temperature at the foot was 310°C. At the head at 266°C, 100 parts/hour of octadecylamine were recovered. The distillation tailing, representing about 20 parts, was essentially constituted with the secondary amine.

So, the yield in primary amine with regard to starting bromo-alkane was about 82 percent.

What is claimed is:

1. In a process for the synthesis of primary hydrocarbyl acyclic amine containing at least eight atoms of carbon in its molecule, consisting essentially of reacting 1-bromo-alkane of at least eight carbon atoms or a mixture thereof, with ammonia in excess with regard to stoichiometry, at a high temperature and pressure, in the presence of solvent, and thereafter treating the resultant hydrobromide with an aqueous solution of strong base to recover the amine in free state, the improvement consisting of carrying out said reaction of 1-bromo-alkane with ammonia at a temperature not exceeding the critical temperature of ammonia, under a pressure of 5 to 40 atmospheres, and wherein said solvent consists of a mixture of a water-miscible polar organic compound and water, said solvent mixture being an homogeneous minimum boiling point azeotrope, said polar organic compound being itself a solvent for said bromoalkane and being inert under the reaction conditions.

2. A process according to claim 1 wherein the organic compound is selected from the group consisting of alcohols, nitriles, and ether-oxides.

3. A process according to claim 1 wherein the molar ratio ammonia/bromo-alkane is between 10/1 and 40/1 and the molar ratio solvent/bromo-alkane is at least equal to 15/1.

4. A process according to claim 1 wherein the molar ratio ammonia/bromo-alkane is 20 to 30/1.

5. A process according to claim 1 wherein the reaction temperature is between 60° and 130°C.

6. A process according to claim 1 wherein the reaction temperature is between 100° and 120°C.

7. A process according to claim 1 wherein said 1-bromo-alkane consists of a mixture of at least two different 1-bromo-alkanes.

* * * * *